US012657970B2

(12) United States Patent
Oka et al.

(10) Patent No.: US 12,657,970 B2
(45) Date of Patent: Jun. 16, 2026

(54) STATE ESTIMATION SYSTEM, DUMP TRUCK, AND STATE ESTIMATION METHOD

(71) Applicant: Komatsu Ltd., Tokyo (JP)

(72) Inventors: Akira Oka, Tokyo (JP); Tatsuya Yamakawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 102 days.

(21) Appl. No.: 18/683,518

(22) PCT Filed: Aug. 9, 2022

(86) PCT No.: PCT/JP2022/030363
§ 371 (c)(1),
(2) Date: Feb. 14, 2024

(87) PCT Pub. No.: WO2023/042575
PCT Pub. Date: Mar. 23, 2023

(65) Prior Publication Data
US 2024/0355155 A1        Oct. 24, 2024

(30) Foreign Application Priority Data
Sep. 16, 2021    (JP) ................................. 2021-151402

(51) Int. Cl.
B60P 1/04          (2006.01)
G07C 5/08          (2006.01)
G01G 19/08          (2006.01)
(52) U.S. Cl.
CPC .............. G07C 5/0825 (2013.01); B60P 1/04 (2013.01); *G01G 19/08* (2013.01)

(58) Field of Classification Search
None
See application file for complete search history.

(56) References Cited

U.S. PATENT DOCUMENTS 6,622,548 B1 *    9/2003    Hernandez .......... F02D 41/1447
                                                        73/114.74
7,743,604 B1 *    6/2010    Albanesi ............ B60H 1/00014
                                                        60/272
(Continued)

FOREIGN PATENT DOCUMENTS

JP          H11-151480  A        6/1999
JP          2012201227  A  *  10/2012
(Continued)

*Primary Examiner* — Peter D Nolan
*Assistant Examiner* — Matthew Cobb
(74) *Attorney, Agent, or Firm* — Troutman Pepper Locke LLP

(57)          ABSTRACT

A state estimation system of a dump truck including an engine and a dump body that includes a flow path through which exhaust gas discharged from the engine flows and on which a load is loaded includes an exhaust gas flow rate acquisition unit that acquires an exhaust gas flow rate indicating detection data of a flow rate of the exhaust gas flowing into the flow path, an exhaust gas temperature acquisition unit that acquires an exhaust gas temperature indicating detection data of a temperature of the exhaust gas flowing into the flow path, and a body temperature estimation unit that estimates a body temperature indicating a temperature of a predetermined portion of an inner surface of the dump body in contact with the load on the basis of the exhaust gas flow rate and the exhaust gas temperature.

16 Claims, 9 Drawing Sheets

(56) References Cited

U.S. PATENT DOCUMENTS

| 2010/0170228 | A1 | 7/2010 | Dickinson | |
|---|---|---|---|---|
| 2012/0169109 | A1 * | 7/2012 | Rivera | B60P 1/286 |
| | | | | 165/41 |
| 2018/0194260 | A1 * | 7/2018 | Dunker | B60P 1/286 |

FOREIGN PATENT DOCUMENTS

| JP | 2013-147881 | A | | 8/2013 | |
|---|---|---|---|---|---|
| JP | 2015112907 | A | * | 6/2015 | |
| JP | 6501854 | B1 | * | 4/2019 | |
| WO | WO-2009085027 | A2 | * | 7/2009 | F01N 9/002 |

* cited by examiner

FIG.1
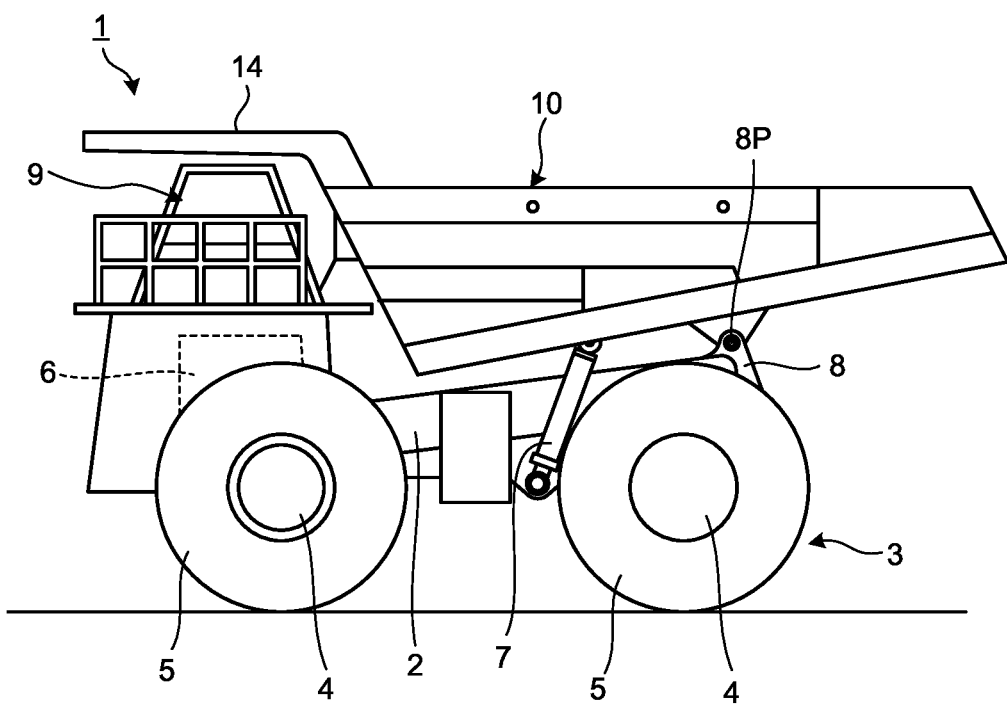
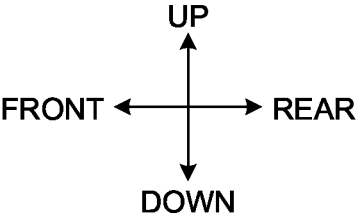

FIG.2
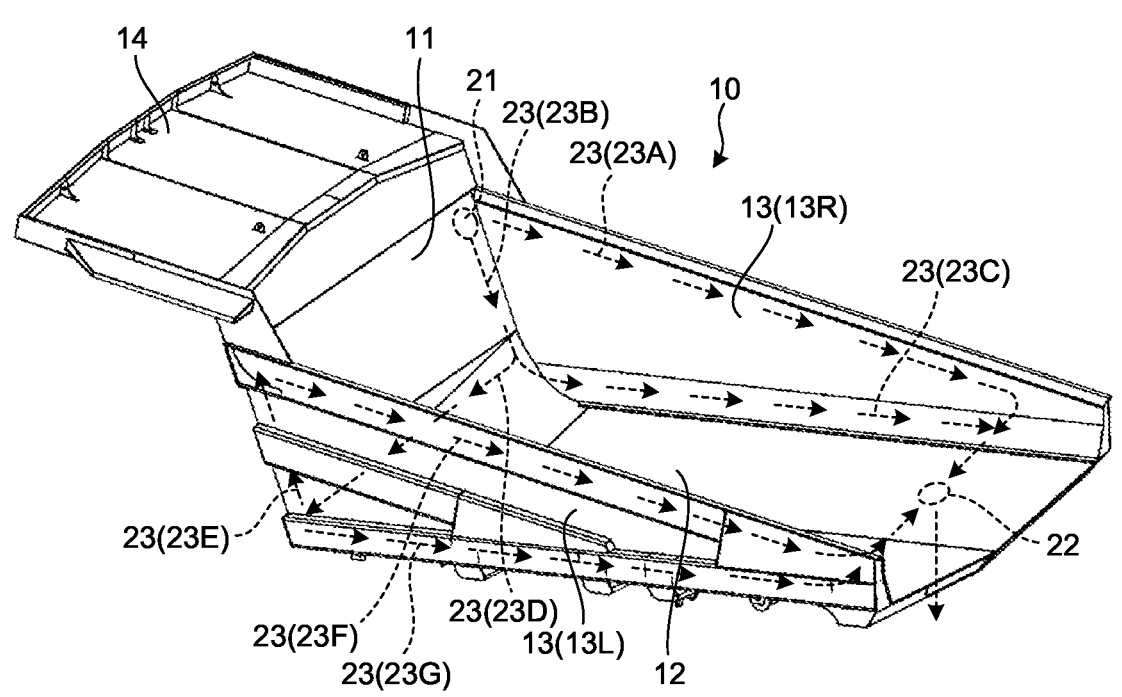
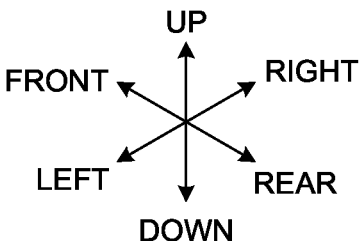

Figure 3:
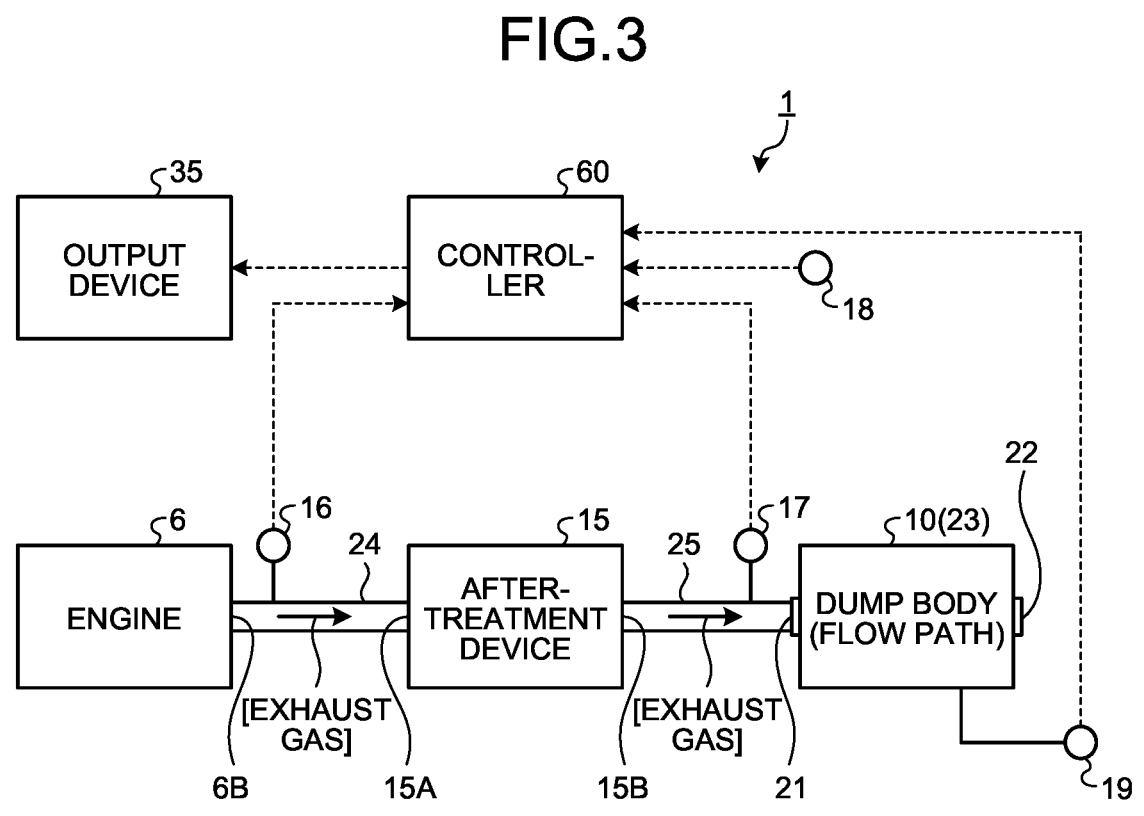

OUTPUT DEVICE

60

CONTROL-LER

18

22

6

ENGINE

16

24

15

AFTER-TREATMENT DEVICE

17

25

10(23)

DUMP BODY (FLOW PATH)

[EXHAUST GAS]

[EXHAUST GAS]

Figure 8:
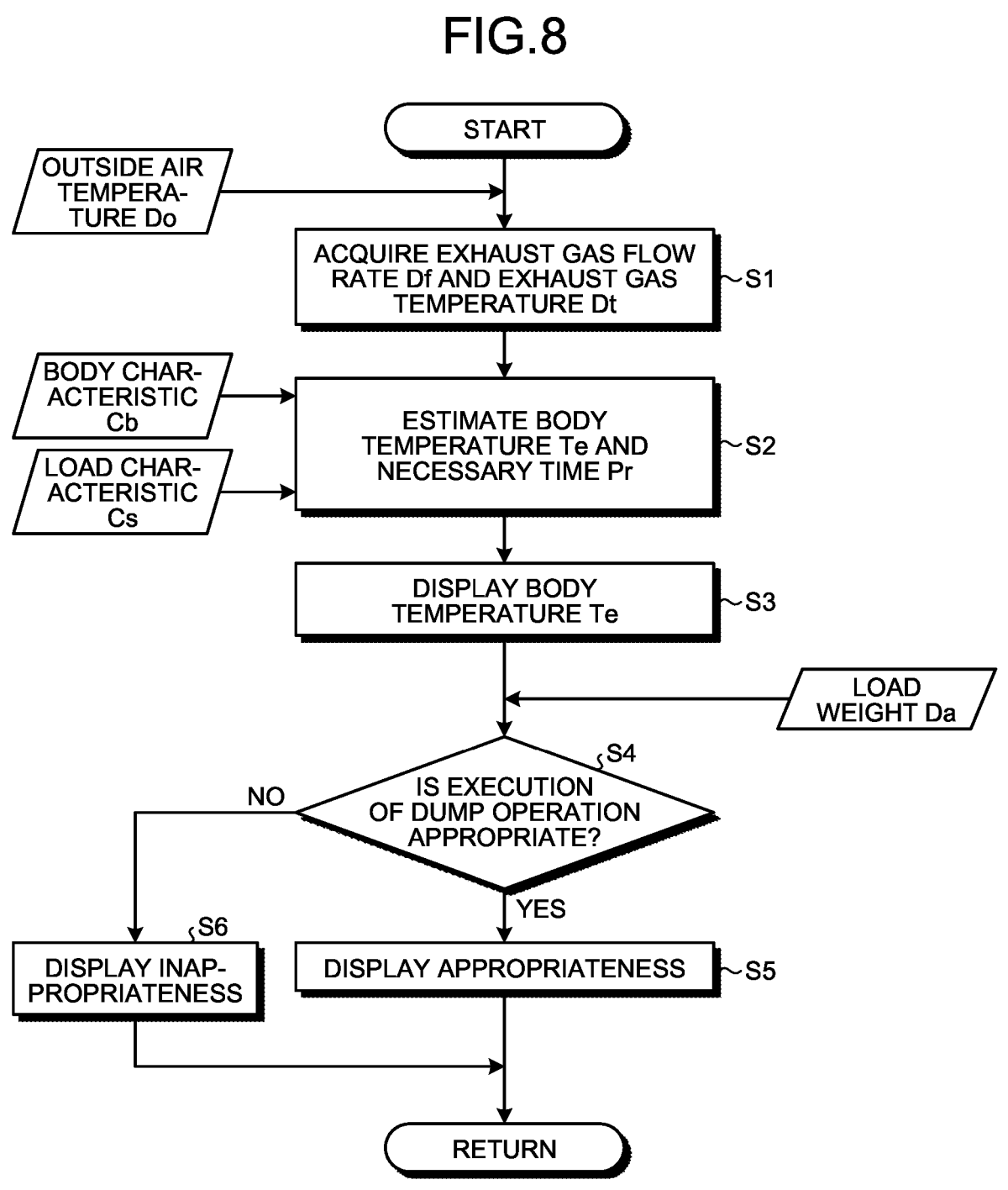

START

OUTSIDE AIR
TEMPERA-
TURE Do

ACQUIRE EXHAUST GAS FLOW
RATE Df AND EXHAUST GAS
TEMPERATURE Dt    ~S1

BODY CHAR-
ACTERISTIC
Cb

LOAD CHAR-
ACTERISTIC
Cs

ESTIMATE BODY
TEMPERATURE Te AND
NECESSARY TIME Pr    ~S2

DISPLAY BODY
TEMPERATURE Te    ~S3

LOAD
WEIGHT Da

IS EXECUTION
OF DUMP OPERATION
APPROPRIATE?    S4

NO

YES

S6

DISPLAY INAP-
PROPRIATENESS

DISPLAY APPROPRIATENESS    ~S5

RETURN

STATE ESTIMATION SYSTEM, DUMP TRUCK, AND STATE ESTIMATION METHOD

FIELD

The present disclosure relates to a state estimation system, a dump truck, and a state estimation method.

BACKGROUND

A dump truck includes a dump body on which a load is loaded. When discharging the load from the dump body, the dump truck performs a dumping operation of the dump body. When the dumping operation is performed, the load is discharged from the dump body by the action of gravity. In a case where the load is wet, even when the dumping operation is performed, a state in which at least a part of the load adheres to an inner surface of the dump body is maintained, and there is a case where the load is not discharged from the dump body. A technique is known in which exhaust gas discharged from the engine of a dump truck is caused to flow through a flow path provided in the dump body in order to suppress adhesion of a load to an inner surface of the dump body. As the exhaust gas having a high temperature flows through the flow path of the dump body, the dump body is heated by the exhaust gas, and the load is dried. Thus, adhesion of the load to the inner surface of the dump body is suppressed. Patent Literature 1 discloses a technique for heating the dump body.

CITATION LIST

Patent Literature

Patent Literature 1: US 2018/0194260 A

SUMMARY

Technical Problem

Even if the dump body is heated by the exhaust gas, when the temperature of the inner surface of the dump body is unknown, it may be difficult to perform the dumping operation at an appropriate timing. If a temperature sensor that detects the temperature of the inner surface of the dump body is installed in the dump body, the temperature of the inner surface of the dump body becomes clear, but there is a possibility that the cost of the dump body increases.

An object of the present disclosure is to acquire a temperature of an inner surface of a dump body.

Solution to Problem

According to an aspect of the present invention, a state estimation system of a dump truck including an engine and a dump body that includes a flow path through which exhaust gas discharged from the engine flows, a load being loaded on the dump body, the state estimation system comprises: an exhaust gas flow rate acquisition unit that acquires an exhaust gas flow rate indicating detection data of a flow rate of the exhaust gas flowing into the flow path; an exhaust gas temperature acquisition unit that acquires an exhaust gas temperature indicating detection data of a temperature of the exhaust gas flowing into the flow path; and a body temperature estimation unit that estimates a body temperature indicating a temperature of a predetermined portion of an inner surface of the dump body in contact with the load on a basis of the exhaust gas flow rate and the exhaust gas temperature.

Advantageous Effects of Invention

According to the present disclosure, a temperature of an inner surface of a dump body is acquired.

BRIEF DESCRIPTION OF DRAWINGS

FIG. 1 is a side view illustrating a dump truck according to an embodiment.

FIG. 2 is a perspective view illustrating a dump body according to the embodiment.

FIG. 3 is a diagram schematically illustrating the dump truck according to the embodiment.

FIG. 8 is a flowchart illustrating a state estimation method according to the embodiment.

DESCRIPTION OF EMBODIMENTS

Figure 4:
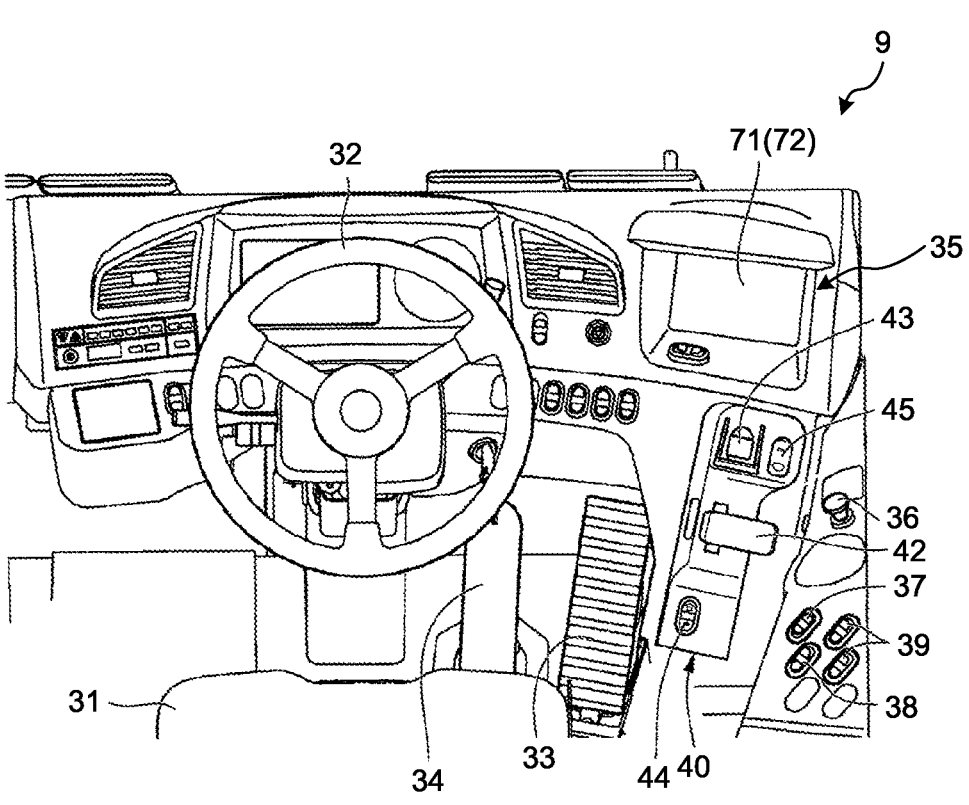
FIG. 4 is a view illustrating an inside of a cab according to the embodiment.

Hereinafter, embodiments according to the present disclosure will be described with reference to the drawings, but the present disclosure is not limited to the embodiments. The components of the embodiments described below can be appropriately combined. Further, some components may not be used.

[Dump Truck]

FIG. 1 is a side view illustrating a dump truck 1 according to an embodiment. In the embodiment, the dump truck 1 is a manned dump truck that operates by a driving operation of a driver. The dump truck 1 is a rigid frame type dump truck.

As illustrated in FIG. 1, the dump truck 1 includes a vehicle body 2, a traveling apparatus 3, an engine 6, a dump body 10, and a hoist cylinder 7.

The vehicle body 2 supports the dump body 10. A cab 9 is provided in an upper portion of a front portion of the vehicle body 2. A driver of the dump truck 1 boards in cab 9.

The traveling apparatus 3 travels while supporting the vehicle body 2. The traveling apparatus 3 includes a plurality of wheels 4. Front wheels 4 are steered wheels. Rear wheels 4 are drive wheels. A tire 5 is mounted on each of the plurality of wheels 4. As the wheels 4 rotate, the dump truck 1 travels.

The engine 6 is a power source of the dump truck 1. Each of the traveling apparatus 3 and the hoist cylinder 7 operates on the basis of power generated by the engine 6. The engine 6 is supported by at least a part of the vehicle body 2. The engine 6 is an internal combustion engine. An example of the engine 6 is a diesel engine. The engine 6 burns fuel to generate power. The combustion of the fuel causes exhaust gas to be discharged from the engine 6.

The dump body 10 is loaded with a load. The load loaded on the dump body 10 is exemplified by earth and sand. A lower portion of a rear part of the dump body 10 is connected to a bracket 8 of the vehicle body 2 via a rotation pin 8P. The dump body 10 is rotatable about the rotation pin 8P.

The hoist cylinder 7 generates power for rotating the dump body 10. The hoist cylinder is a hydraulic cylinder. The hoist cylinder 7 is disposed between the vehicle body 2 and the dump body 10.

The dump body 10 changes to a loading posture and a standing posture by extension and contraction of the hoist cylinder 7. The loading posture refers to a posture lowered to be closest to the vehicle body 2 in a movable range of the dump body 10. The standing posture refers to a posture in which the dump body 10 is raised so as to be most separated from the vehicle body 2 in the movable range of the dump body 10. When the dump body 10 is in the loading posture, a load is loaded on the dump body 10. The dump truck 1 travels when the dump body 10 is in the loading posture. When the dump body 10 changes from the loading posture to the standing posture in a state where the load is loaded on the dump body 10, the load is discharged from the dump body 10 by the action of gravity.

In the embodiment, the operation of changing the dump body 10 from the loading posture to the standing posture in a state where the load is loaded on the dump body 10 is appropriately referred to as a dumping operation. When the dumping operation of the dump body 10 is performed, the load is discharged from the dump body 10.

In the embodiment, the dumping operation of the dump body 10 includes an operation of rotating the dump body 10 backward. That is, in the embodiment, the dump body 10 discharges the load rearward by a rear dump method.

[Dump Body]

FIG. 2 is a perspective view illustrating the dump body 10 according to the embodiment. As illustrated in FIG. 2, the dump body 10 includes a front plate 11, a bottom plate 12 connected to a lower end of the front plate 11, a side plate 13 connected to left and right ends of the 30 front plate 11 and left and right ends of the bottom plate 12, and a protector plate 14 connected to an upper end of the front plate 11.

The front plate 11, the bottom plate 12, the side plate 13, and the protector plate 14 are integrated. Each of the front plate 11, the bottom plate 12, the side plate 13, and the protector plate 14 is formed by a steel material.

When the dump body 10 is in the loading posture, the protector plate 14 is disposed above the cab 9. A rear end of the protector plate 14 and the upper end of the front plate 11 are connected. The lower end of the front plate 11 and a front end of the bottom plate 12 are connected.

The side plate 13 is disposed on each of a right side and a left side of a center of the dump body 10 in a left-right direction. The side plate 13 includes a right side plate 13R disposed on the right side of the center of the dump body 10 and connected to each of a right end of the front plate 11 and a right end of the bottom plate 12, and a left side plate 13L disposed on the left side of the center of the dump body 10 and connected to each of a left end of the front plate 11 and a left end of the bottom plate 12.

The front plate 11 has a front surface facing forward and a rear surface facing in a direction opposite to the front surface. The bottom plate 12 has a bottom surface facing upward and a lower surface facing a direction opposite to the bottom surface.

The side plate 13 has an inner surface facing the center side of the dump body 10 and an outer surface facing a direction opposite to the inner surface in the left-right direction.

In the dump body 10, a loading space in which a load is loaded is defined among the rear surface of the front plate 11, the bottom surface of the bottom plate 12, and the inner surfaces of the side plates 13. The load contacts at least a part of the rear surface of the front plate 11, the bottom surface of the bottom plate 12, or the inner surfaces of the side plates 13. In the embodiment, the rear surface of the front plate 11, the bottom surface of the bottom plate 12, and the inner surfaces of the side plates 13 of the dump body 10 in contact with the load are appropriately collectively referred to as an inner surface of the dump body 10.

The dump body 10 includes an introduction port 21 through which the exhaust gas discharged from the engine 6 is introduced, a flow path 23 through which the exhaust gas discharged from the engine 6 flows, and an exhaust port 22 through which the exhaust gas flowing through the flow path 23 is discharged. In the flow path 23, the introduction port 21 side has the same meaning as an upstream side of the exhaust gas, and the exhaust port 22 side has the same meaning as a downstream side of the exhaust gas.

The introduction port 21 is provided on the front surface of the front plate 11. The introduction port 21 is provided at a right part of an upper part of the front surface of the front plate 11. Note that the introduction port 21 may be provided at a center of the front surface in the left-right direction.

The vehicle body 2 includes a conduit that guides the exhaust gas discharged from the engine 6 to the introduction port 21. When the dump body 10 is in the loading posture, an outlet of the conduit and the introduction port 21 are connected. In the loading posture of the dump body 10, the exhaust gas discharged from the engine 6 is supplied to the introduction port 21. When the dump body 10 is in the standing posture, the outlet of the conduit and the introduction port 21 are separated. In the standing posture of the dump body 10, the exhaust gas discharged from the engine 6 is discharged from the outlet of the conduit.

The exhaust port 22 is provided on the lower surface of the bottom plate 12. The exhaust port 22 is provided in a rear part of the lower surface of the bottom plate 12. Note that the exhaust port 22 may be provided in the rear part of the side plate 13.

The flow path 23 is provided inside the dump body 10. At least a part of the flow path 23 is provided in the side plate 13. The exhaust gas discharged from the engine 6 flows into the flow path 23 from the introduction port 21. The exhaust gas flowing through the flow path 23 is discharged from the exhaust port 22.

The flow path 23 includes a first flow path 23A provided at an upper end of the right side plate 13R, a second flow path 23B provided at a boundary between the front plate 11 and the right side plate 13R, a third flow path 23C provided at a lower end of the right side plate 13R, a fourth flow path 23D provided at a boundary between the front plate 11 and the bottom plate 12, a fifth flow path 23E provided at a boundary between the front plate 11 and the left side plate 13L, a sixth flow path 23F provided at an upper end of the left side plate 13L, and a seventh flow path 23G provided at a lower end of the left side plate 13L.

Each of the upper end and the lower end of the right side plate 13R includes a strength member such as a rib. Each of the upper end and the lower end of the left side plate 13L includes a strength member such as a rib. The first flow path 23A, the third flow path 23C, the sixth flow path 23F, and the seventh flow path 23G are provided in a strength member of the dump body 10.

The first flow path 23A extends in a front-rear direction at the upper end of the right side plate 13R. Note that the first flow path 23A may be inclined with respect to the front-rear direction. A front end of the first flow path 23A is connected to the introduction port 21. The exhaust gas flowing into the first flow path 23A from the introduction port 21 flows through the first flow path 23A toward a rear end of the first flow path 23A.

The second flow path 23B is provided at the boundary between the front plate 11 and the right side plate 13R. The second flow path 23B is inclined backward toward the lower side. An upper end of the second flow path 23B is connected to the introduction port 21. The exhaust gas flowing into the second flow path 23B from the introduction port 21 flows through the second flow path 23B toward a lower end of the second flow path 23B.

The third flow path 23C is provided at the lower end of the right side plate 13R. The third flow path 23C is inclined upward toward the rear. A front end of the third flow path 23C is connected to the lower end of the second flow path 23B. The exhaust gas flowing from the second flow path 23B into the third flow path 23C flows through the third flow path 23C toward a rear end of the third flow path 23C.

The fourth flow path 23D extends in the left-right direction at the boundary between the front plate 11 and the bottom plate 12. A right end of the fourth flow path 23D is connected to the lower end of the second flow path 23B. The exhaust gas flowing from the second flow path 23B into the fourth flow path 23D flows through the fourth flow path 23D toward a left end of the fourth flow path 23D.

The fifth flow path 23E is provided at the boundary between the front plate 11 and the left side plate 13L. The fifth flow path 23E is inclined forward toward the upper side. A lower end of the fifth flow path 23E is connected to the left end of the fourth flow path 23D. The exhaust gas flowing from the fourth flow path 23D into the fifth flow path 23E flows through the fifth flow path 23E toward an upper end of the fifth flow path 23E.

The sixth flow path 23F extends in the front-rear direction at the upper end of the left side plate 13L. Note that the sixth flow path 23F may be inclined with respect to the front-rear direction. A front end of the sixth flow path 23F is connected to the upper end of the fifth flow path 23E. The exhaust gas flowing from the fifth flow path 23E into the sixth flow path 23F flows through the sixth flow path 23F toward a rear end of the sixth flow path 23F.

The seventh flow path 23G is provided at the lower end of the left side plate 13L. The seventh flow path 23G is inclined upward toward the rear. A front end of the seventh flow path 23G is connected to the left end of the fourth flow path 23D. The exhaust gas flowing from the fourth flow path 23D into the seventh flow path 23G flows through the seventh flow path 23G toward a rear end of the seventh flow path 23G.

Each of the rear end of the first flow path 23A, the rear end of the third flow path 23C, the rear end of the sixth flow path 23F, and the rear end of the seventh flow path 23G is connected to the exhaust port 22 via a flow path provided on the lower surface of the bottom plate 12. The exhaust gas flowing through the flow path 23 is discharged from the exhaust port 22 to the lower side of the bottom plate 12.

The exhaust gas supplied from the engine 6 to the introduction port 21 is branched into the first flow path 23A and the second flow path 23B. Thus, the exhaust resistance of the engine 6 is reduced, and the deterioration of the fuel consumption rate of the engine 6 is suppressed.

[Flow of Exhaust Gas]

FIG. 3 is a diagram schematically illustrating the dump truck 1 according to the embodiment. As illustrated in FIG. 3, the dump truck 1 includes the engine 6, a conduit 24, an aftertreatment device 15, a conduit 25, the dump body 10, an exhaust gas flow rate sensor 16, an exhaust gas temperature sensor 17, an outside air temperature sensor 18, a load weight sensor 19, a controller 60, and an output device 35.

The conduit 24 connects an exhaust gas outlet 6B of the engine 6 and an exhaust gas inlet 15A of the aftertreatment device 15. The exhaust gas discharged from the exhaust gas outlet 6B of the engine 6 flows through the conduit 24 to be supplied to the aftertreatment device 15.

The aftertreatment device 15 purifies the exhaust gas discharged from the engine 6. An example of the aftertreatment device 15 is a urea selective catalytic reduction (SCR) system that reduces and purifies nitrogen oxides (NOx) contained in the exhaust gas using a selective catalyst and a reducing agent.

The conduit 25 connects an exhaust gas outlet 15B of the aftertreatment device 15 and the introduction port 21 of the dump body 10. The exhaust gas discharged from the exhaust gas outlet 15B of the aftertreatment device 15 is supplied to the flow path 23 of the dump body 10 through the conduit 25.

The exhaust gas discharged from the aftertreatment device 15 and flowing into the flow path 23 through the introduction port 21 flows through the flow path 23 and then is discharged from the exhaust port 22.

The exhaust gas flow rate sensor 16 detects the flow rate of the exhaust gas flowing into the flow path 23 of the dump body 10. In the embodiment, the exhaust gas flow rate sensor 16 is disposed in the vicinity of the exhaust gas outlet 6B of the engine 6, and detects the flow rate of the exhaust gas flowing out from the exhaust gas outlet 6B of the engine 6. Note that the exhaust gas flow rate sensor 16 may be disposed in a middle portion of the conduit 24, may be disposed in the vicinity of the exhaust gas inlet 15A of the aftertreatment device 15, may be disposed in the vicinity of the exhaust gas outlet 15B of the aftertreatment device 15, or may be disposed in a middle portion of the conduit 25. The exhaust gas flow rate sensor 16 may be disposed in the vicinity of the introduction port 21 of the dump body 10 and detect the flow rate of the exhaust gas flowing into the introduction port 21.

The exhaust gas temperature sensor 17 detects the temperature of the exhaust gas flowing into the flow path 23 of the dump body 10. In the embodiment, the exhaust gas temperature sensor 17 is disposed in the vicinity of the introduction port 21 of the dump body 10 and detects the temperature of the exhaust gas flowing into the introduction port 21. Note that the exhaust gas temperature sensor 17 may be disposed in the vicinity of the exhaust gas outlet 6B of the engine 6 to detect the temperature of the exhaust gas flowing out of the engine 6. Note that the exhaust gas temperature sensor 17 may be disposed in the middle portion of the conduit 24, may be disposed in the vicinity of the exhaust gas inlet 15A of the aftertreatment device 15, may be disposed in the vicinity of the exhaust gas outlet 15B of the aftertreatment device 15, or may be disposed in the middle portion of the conduit 25.

The outside air temperature sensor 18 detects the temperature of the outside air around the dump body 10. The outside air temperature sensor 18 is disposed, for example, above the vehicle body 2. Before the exhaust gas is supplied to the flow path 23 of the dump body 10, the temperature of the outside air and the temperature of the dump body 10 are substantially equal. The outside air temperature sensor 18 can detect the temperature of the dump body 10 before the exhaust gas is supplied to the flow path 23 by detecting the temperature of the outside air.

The load weight sensor 19 detects the weight of the load loaded on the dump body 10. The traveling apparatus 3 includes a suspension cylinder that supports the rear wheel 4. In the embodiment, the load weight sensor 19 is disposed on the suspension cylinder. The weight of the dump body 10 is known data. The load weight sensor 19 can detect the weight of the load loaded on the dump body 10 by detecting the weight of the dump body 10.

The controller 60 includes a computer system. The controller 60 is mounted on the vehicle body 2.

The output device 35 outputs predetermined output data. The output device 35 is disposed inside the cab 9. The output device 35 provides output data to the driver riding in the cab 9. In the embodiment, the output device 35 includes a display device. The display device displays display data as output data.

[Cab]

FIG. 4 is a view illustrating the inside of the cab 9 according to the embodiment. As illustrated in FIG. 4, a driver seat 31, a steering wheel 32, an accelerator pedal 33, a brake pedal 34, the output device 35, and an operation device 40 are disposed inside the cab 9.

Inside the cab 9, a cigarette lighter 36, a power window switch 37, a side lamp switch 38, and an option switch 39 are disposed on the right side of the operation device 40. As the option switch 39, a fog lamp switch or a rotary lamp switch is exemplified.

The driver of the dump truck 1 sits on the driver seat 31. The steering wheel 32 is operated by the driver to change the traveling direction of the dump truck 1. The front wheels 4 are steered by operating the steering wheel 32. The accelerator pedal 33 is operated by the driver to accelerate the traveling apparatus 3. When the accelerator pedal 33 is operated, the rotational speeds of the rear wheels 4 are increased, and the traveling apparatus 3 is accelerated. The brake pedal 34 is operated by the driver to decelerate or stop the traveling apparatus 3.

The output device 35 provides predetermined output data to the driver. The output device 35 includes a display device that displays display data as the output data. The output device 35 includes a display 71 that displays the display data and a display controller 72. The display 71 includes a flat panel display such as a liquid crystal display (LCD) or an organic electroluminescence display (OELD).

The operation device 40 is operated by the driver. The operation device 40 includes a shift lever 42, a hoist switch 43, a parking brake switch 44, and a hoist switch lock knob 45.

The shift lever 42 is operated to change the speed stage of the traveling apparatus 3. Further, the shift lever 42 is operated to switch between forward movement and backward movement of the dump truck 1. The hoist switch 43 is operated to drive the hoist cylinder 7. When the hoist switch 43 is operated, the dump body 10 performs a dumping operation. The parking brake switch 44 is operated to operate a parking brake of the dump truck 1. The hoist switch lock knob 45 is operated to disable the hoist switch 43.

[Work Site]

Figure 5:
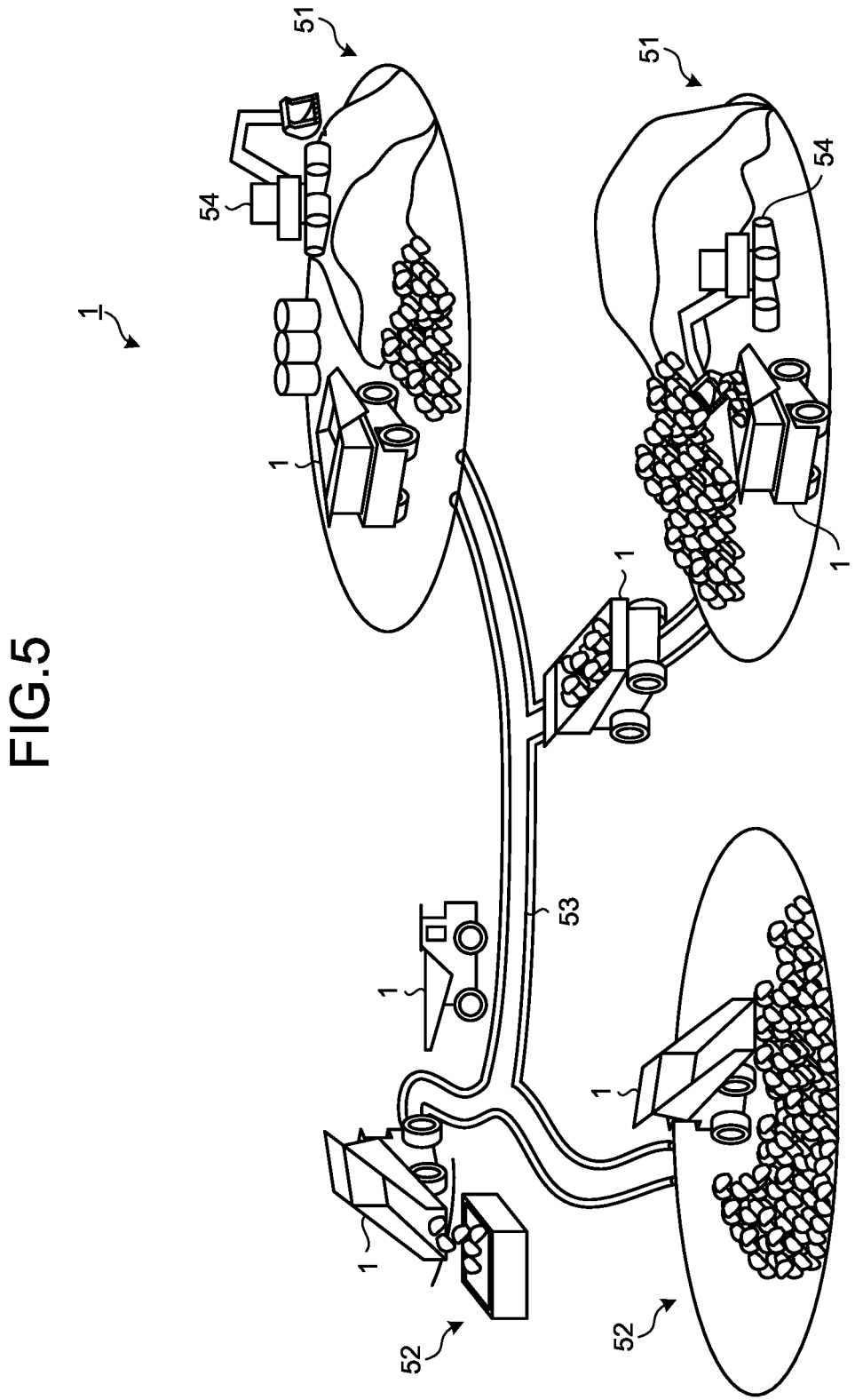
FIG. 5 is a diagram schematically illustrating a work site where the dump truck according to the embodiment operates.

FIG. 5 is a diagram schematically illustrating a work site 50 where the dump truck 1 according to the embodiment operates. The dump truck 1 is a self-propelled off-road dump truck that operates at the work site 50. In the embodiment, the work site 50 is a mine. The mine refers to a workplace where minerals are mined.

The work site 50 includes a loading site 51, a discharging site 52, and a transportation path 53. The loading site 51 is an area where a loader 54 such as an excavator performs loading work of loading a load onto the dump body 10 of the dump truck 1. The discharging site 52 is an area where the dump truck 1 performs soil discharging work of discharging a load from the dump body 10. The transportation path 53 is a path for the dump truck 1 connecting the loading site 51 and the discharging site 52. The dump truck 1 travels on the transportation path 53 so as to reciprocate between the loading site 51 and the discharging site 52.

[State Estimation System]

Figure 6:
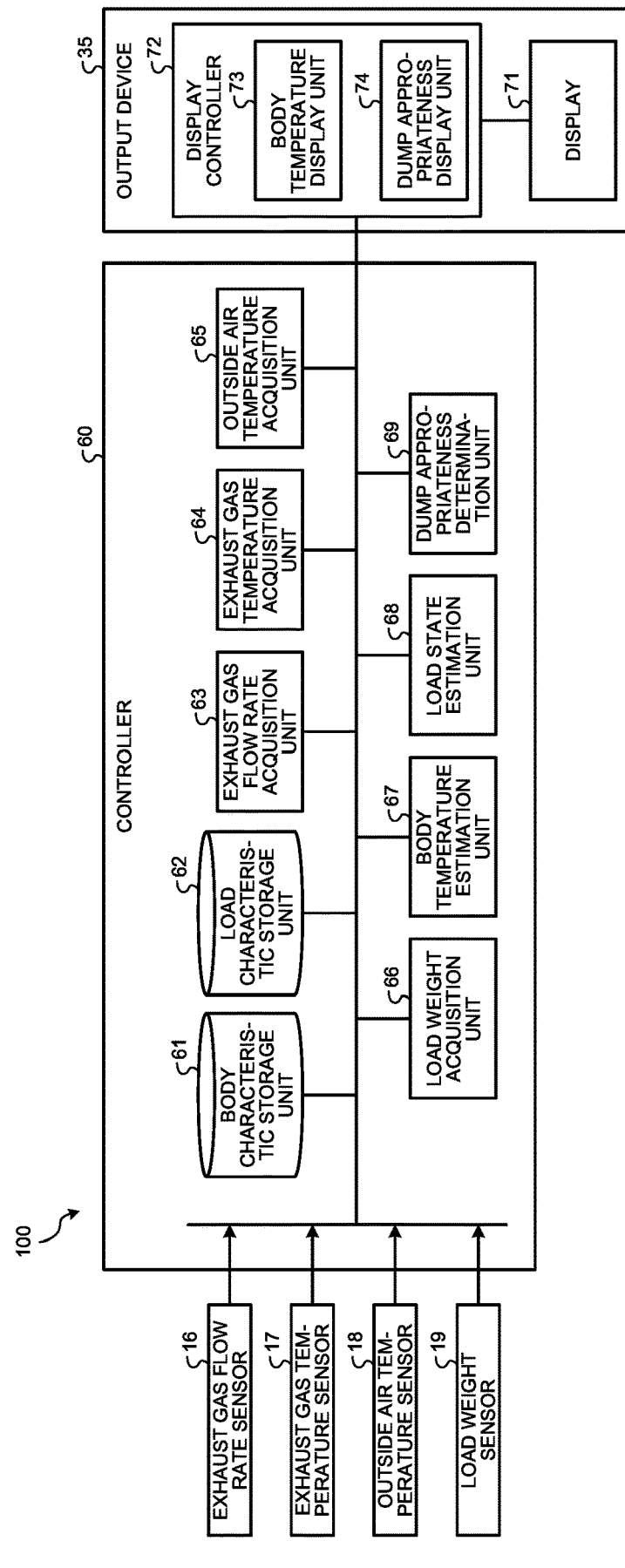
FIG. 6 is a functional block diagram illustrating a state estimation system according to the embodiment.

FIG. 6 is a functional block diagram illustrating the state estimation system 100 according to the embodiment. The state estimation system 100 is mounted on the dump truck 1. The state estimation system 100 estimates a body temperature Te indicating the temperature of a predetermined portion MP on the inner surface of the dump body 10 in contact with the load on the basis of detection data of the exhaust gas flow rate sensor 16 and detection data of the exhaust gas temperature sensor 17. Further, the state estimation system 100 determines the appropriateness of the dumping operation of the dump body 10 on the basis of the estimated body temperature Te.

Figure 7:
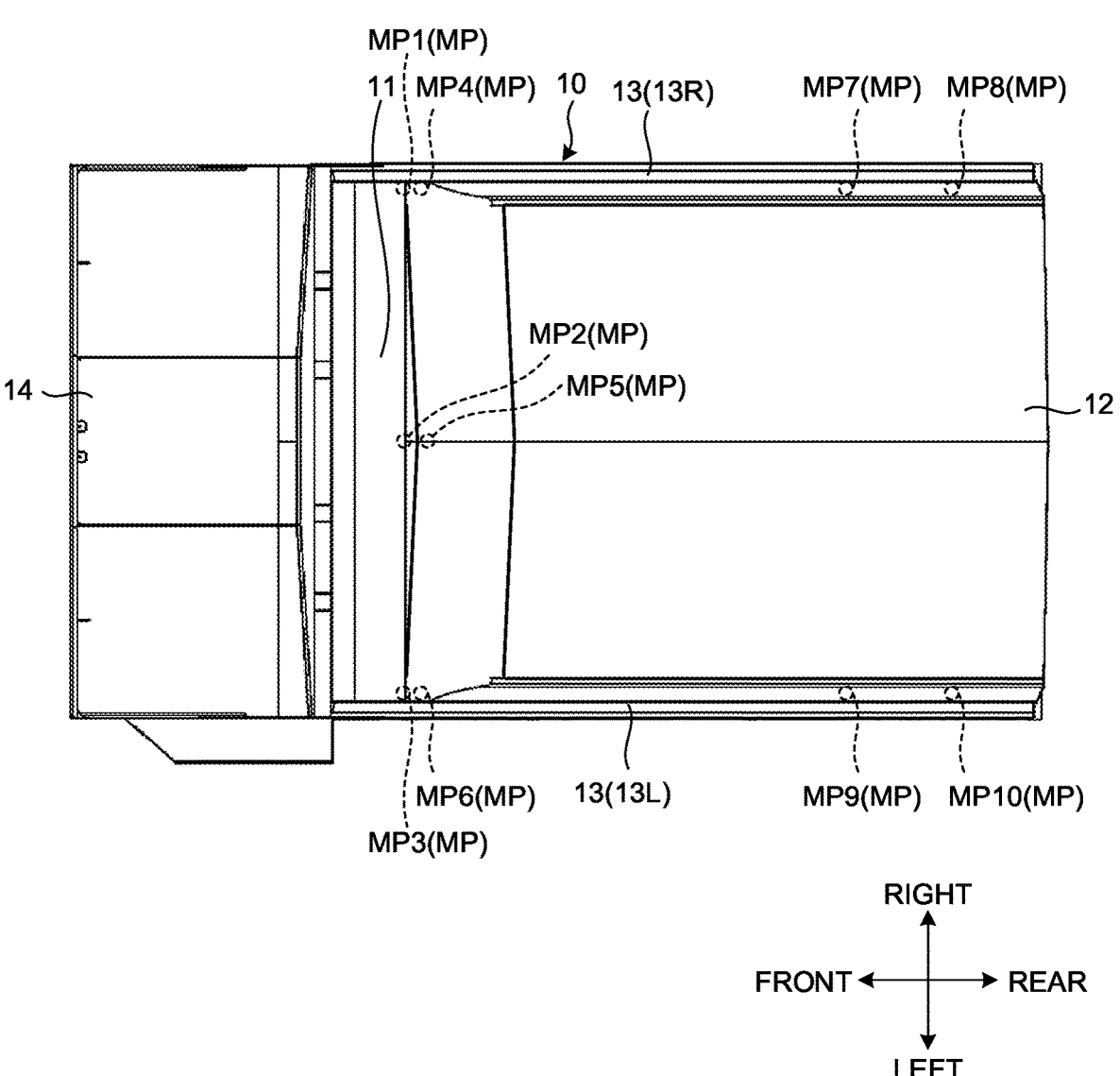
FIG. 7 is a view for describing predetermined portions of an inner surface of the dump body according to the embodiment.

FIG. 7 is a view for describing predetermined portions MP on the inner surface of the dump body 10 according to the embodiment. As described above, in the dump body 10, the loading space in which the load is loaded is defined among the rear surface of the front plate 11, the bottom surface of the bottom plate 12, and the inner surfaces of the side plates 13. The inner surface of the dump body 10 in contact with the load includes the rear surface of the front plate 11, the bottom surface of the bottom plate 12, and the inner surfaces of the side plates 13.

The predetermined portion MP is a temperature estimation point at which the temperature is estimated by the state estimation system 100 on the inner surface of the dump body 10. A plurality of the predetermined portions MP is defined on the inner surface of the dump body 10. As illustrated in FIG. 7, in the embodiment, the predetermined portions MP are defined at 10 portions on the inner surface of the dump body 10. Among the plurality of predetermined portions MP, at least some of the predetermined portions MP are defined in the vicinity of the flow path 23.

Among the plurality of predetermined portions MP, each of a first predetermined portion MP1, a second predetermined portion MP2, and a third predetermined portion MP3 is defined at the upper end of the front plate 11. In the left-right direction, the first predetermined portion MP1 is defined at the right end of the front plate 11, the second predetermined portion MP2 is defined at a center of the front plate 11, and the third predetermined portion MP3 is defined at the left end of the front plate 11.

Among the plurality of predetermined portions MP, each of a fourth predetermined portion MP4, a fifth predetermined portion MP5, and a sixth predetermined portion MP6 is defined at the lower end of the front plate 11. In the left-right direction, the fourth predetermined portion MP4 is defined at the right end of the front plate 11, the fifth predetermined portion MP5 is defined at the center of the front plate 11, and the sixth predetermined portion MP6 is defined at the left end of the front plate 11.

Among the plurality of predetermined portions MP, each of a seventh predetermined portion MP7 and an eighth predetermined portion MP8 is defined at the lower end of the right side plate 13R. In the front-rear direction, the seventh predetermined portion MP7 is defined at a center of the right side plate 13R, and the eighth predetermined portion MP8 is defined at a rear part of the right side plate 13R.

Among the plurality of predetermined portions MP, each of a ninth predetermined portion MP9 and a tenth predetermined portion MP10 is defined at the lower end of the left side plate 13L. In the front-rear direction, the ninth predetermined portion MP9 is defined at a center of the left side plate 13L, and the tenth predetermined portion MP10 is defined at a rear part of the left side plate 13L.

Note that the predetermined portions MP may not be defined at 10 portions on the inner surface of the dump body 10, and may be defined at any plural portions.

As illustrated in FIG. 6, the state estimation system 100 includes the exhaust gas flow rate sensor 16, the exhaust gas temperature sensor 17, the outside air temperature sensor 18, the load weight sensor 19, the controller 60, and the output device 35.

The controller 60 includes a body characteristic storage unit 61, a load characteristic storage unit 62, an exhaust gas flow rate acquisition unit 63, an exhaust gas temperature acquisition unit 64, an outside air temperature acquisition unit 65, a load weight acquisition unit 66, a body temperature estimation unit 67, a load state estimation unit 68, and a dump appropriateness determination unit 69.

The output device 35 includes the display 71 and the display controller 72. The display controller 72 includes a body temperature display unit 73 and a dump appropriateness display unit 74.

The body characteristic storage unit 61 stores body characteristics Cb indicating characteristics of the dump body 10. Examples of the body characteristics Cb include a shape of the dump body 10, a dimension of the dump body 10, a material of the dump body 10, and a thermal characteristic of the dump body 10. As thermal characteristics of the dump body 10, a heat capacity of the dump body 10 and a heat transfer coefficient of the dump body 10 are exemplified. The body characteristics Cb are known data seen from specifications of the dump truck 1. The body characteristics Cb are stored in advance in the body characteristic storage unit 61.

The load characteristic storage unit 62 stores load characteristics Cs indicating characteristics of the load loaded on the dump body 10. In the embodiment, the load includes earth and sand. Examples of the load characteristics Cs include material characteristics (soil properties) of the load, a moisture amount (degree of moisture) of the load, and a temperature of the load. Examples of material characteristics of the load include a component of the load and a specific gravity of the load. The load characteristics Cs are known data that can be seen from a preliminary survey of the loading site 51. The load characteristics Cs are stored in advance in the load characteristic storage unit 62. The load characteristics Cs may be set for each loading site 51 and stored in the load characteristic storage unit 62. Further, the load characteristics Cs may be transmitted from a management computer of a control facility every time the dump truck 1 goes to a different loading site 51, and stored in the load characteristic storage unit 62.

The exhaust gas flow rate acquisition unit 63 acquires detection data of the exhaust gas flow rate sensor 16. The exhaust gas flow rate sensor 16 detects the flow rate of the exhaust gas flowing into the flow path 23 of the dump body 10. The exhaust gas flow rate acquisition unit 63 acquires an exhaust gas flow rate Df indicating detection data of the flow rate of the exhaust gas flowing into the flow path 23 of the dump body 10 detected by the exhaust gas flow rate sensor 16.

The exhaust gas temperature acquisition unit 64 acquires detection data of the exhaust gas temperature sensor 17. The exhaust gas temperature sensor 17 detects the temperature of the exhaust gas flowing into the flow path 23 of the dump body 10. The exhaust gas temperature acquisition unit 64 acquires an exhaust gas temperature Dt indicating detection data of the temperature of the exhaust gas flowing into the flow path 23 of the dump body 10 detected by the exhaust gas temperature sensor 17. The exhaust gas temperature Dt is, for example, 400 [° C.].

The outside air temperature acquisition unit 65 acquires detection data of the outside air temperature sensor 18. The outside air temperature sensor 18 detects the temperature of the outside air around the dump body 10. The outside air temperature acquisition unit 65 acquires an outside air temperature Do indicating detection data of the temperature of the outside air around the dump body 10 detected by the outside air temperature sensor 18.

The load weight acquisition unit 66 acquires detection data of the load weight sensor 19. The load weight sensor 19 detects the weight of the load loaded on the dump body 10. The load weight acquisition unit 66 acquires a load weight Da indicating detection data of the weight of the load loaded on the dump body 10 detected by the load weight sensor 19.

The body temperature estimation unit 67 estimates the body temperature Te indicating a temperature of the predetermined portion MP on the inner surface of the dump body 10 in contact with the load on the basis of the exhaust gas flow rate Df and the exhaust gas temperature Dt. As described with reference to FIG. 7, a plurality of the predetermined portions MP is defined on the inner surface of the dump body 10. The body temperature estimation unit 67 estimates the body temperature Te of each of the plurality of the predetermined portions MP.

In the embodiment, the body temperature estimation unit 67 holds correlation data (map data) among the exhaust gas flow rate Df, the exhaust gas temperature Dt, and the body temperature Te. The correlation data can be created on the basis of prior experiments or simulations. The body temperature estimation unit 67 can estimate the body temperature Te by collating the correlation data with the exhaust gas flow rate Df detected by the exhaust gas flow rate sensor 16 and the exhaust gas temperature Dt detected by the exhaust gas temperature sensor 17. When the correlation data is discrete data, the body temperature Te may be estimated by interpolation.

Note that, when a simulation model of the dump body 10 is held in the body temperature estimation unit 67, the body temperature estimation unit 67 may estimate the body temperature Te by performing numerical analysis on the simulation model of the dump body 10 on the basis of the exhaust gas flow rate Df and the exhaust gas temperature Dt.

Further, the body temperature estimation unit 67 estimates a necessary time Pr until the body temperature Te reaches a prescribed temperature Tp on the basis of the exhaust gas flow rate Df and the exhaust gas temperature Dt. The prescribed temperature Tp related to the body temperature Te is, for example, 120 [° C.]. For example, when the body temperature Te is estimated to be 30 [° C.], the body temperature estimation unit 67 estimates the necessary time Pr until the body temperature Te reaches 120 [° C.] from 30 [° C.].

In the embodiment, the body temperature estimation unit 67 holds correlation data (map data) of the exhaust gas flow rate Df, the exhaust gas temperature Dt, the body temperature Te, and the necessary time Pr. The correlation data can be created on the basis of prior experiments or simulations. The body temperature estimation unit 67 can estimate the necessary time Pr by collating the correlation data with the exhaust gas flow rate Df detected by the exhaust gas flow rate sensor 16 and the exhaust gas temperature Dt detected by the exhaust gas temperature sensor 17.

Note that, when the simulation model of the dump body 10 is held in the body temperature estimation unit 67, the body temperature estimation unit 67 may estimate the necessary time Pr by performing numerical analysis on the simulation model of the dump body 10 on the basis of the exhaust gas flow rate Df and the exhaust gas temperature Dt.

Note that the body temperature estimation unit 67 may estimate the necessary time Pr on the basis of the exhaust gas flow rate Df, the exhaust gas temperature Dt, and the outside air temperature Do. As described above, before the exhaust gas is supplied to the flow path 23 of the dump body 10, the temperature of the outside air is substantially equal to the temperature of the dump body 10. That is, the outside air temperature Do is substantially equal to the temperature of the dump body 10 before the exhaust gas is supplied to the flow path 23. Thus, the outside air temperature Do can be regarded as an initial value related to the body temperature Te before the exhaust gas is supplied to the flow path 23. The body temperature estimation unit 67 can estimate the necessary time Pr with high accuracy on the basis of the exhaust gas flow rate Df, the exhaust gas temperature Dt, and the outside air temperature Do. When correlation data of the exhaust gas flow rate Df, the exhaust gas temperature Dt, the outside air temperature Do, the body temperature Te, and the necessary time Pr is created, the body temperature estimation unit 67 can estimate the necessary time Pr by collating the exhaust gas flow rate Df, the exhaust gas temperature Dt, and the outside air temperature Do with the correlation data. Further, when the simulation model of the dump body 10 is held in the body temperature estimation unit 67, the body temperature estimation unit 67 can estimate the necessary time Pr by performing numerical analysis on the simulation model of the dump body 10 on the basis of the exhaust gas flow rate Df, the exhaust gas temperature Dt, and the outside air temperature Do.

Note that the body temperature estimation unit 67 may estimate the necessary time Pr on the basis of the exhaust gas flow rate Df, the exhaust gas temperature Dt, the outside air temperature Do, and the body characteristics Cb. The necessary time Pr may change on the basis of the body characteristics Cb. For example, in a case of the body characteristics Cb in which the heat of the exhaust gas flowing through the flow path 23 is easily transferred to the predetermined portions MP, the necessary time Pr is likely to be shortened. In a case of the body characteristics Cb in which the heat of the exhaust gas flowing through the flow path 23 is less likely to be transferred to the predetermined portions MP, the necessary time Pr is likely to be long. Thus, the body temperature estimation unit 67 can estimate the necessary time Pr with higher accuracy on the basis of the exhaust gas flow rate Df, the exhaust gas temperature Dt, the outside air temperature Do, and the body characteristics Cb. When the correlation data of the exhaust gas flow rate Df, the exhaust gas temperature Dt, the outside air temperature Do, the body characteristics Cb, the body temperature Te, and the necessary time Pr is created, the body temperature estimation unit 67 can estimate the necessary time Pr by collating the exhaust gas flow rate Df, the exhaust gas temperature Dt, the outside air temperature Do, and the body characteristics Cb with the correlation data. Further, when the simulation model of the dump body 10 is held in the body temperature estimation unit 67, the body temperature estimation unit 67 can estimate the necessary time Pr by performing numerical analysis on the simulation model of the dump body 10 on the basis of the exhaust gas flow rate Df, the exhaust gas temperature Dt, the outside air temperature Do, and the body characteristics Cb.

Note that, when a load is loaded on the dump body 10, the body temperature estimation unit 67 may estimate the necessary time Pr on the basis of the exhaust gas flow rate Df, the exhaust gas temperature Dt, the outside air temperature Do, and the load characteristics Cs. The necessary time Pr may change on the basis of the load characteristics Cs. For example, when the moisture amount of the load is small or the temperature of the load is high, the necessary time Pr is likely to be short. When the moisture amount of the load is large or the temperature of the load is low, the necessary time Pr is likely to be long. Thus, the body temperature estimation unit 67 can estimate the necessary time Pr with higher accuracy on the basis of the exhaust gas flow rate Df, the exhaust gas temperature Dt, the outside air temperature Do, and the load characteristics Cs. When correlation data of the exhaust gas flow rate Df, the exhaust gas temperature Dt, the outside air temperature Do, the load characteristics Cs, the body temperature Te, and the necessary time Pr is created, the body temperature estimation unit 67 can estimate the necessary time Pr by collating the exhaust gas flow rate Df, the exhaust gas temperature Dt, the outside air temperature Do, and the load characteristics Cs with the correlation data. Further, when the simulation model of the dump body 10 is held in the body temperature estimation unit 67, the body temperature estimation unit 67 can estimate the necessary time Pr by performing numerical analysis on the simulation model of the dump body 10 on the basis of the exhaust gas flow rate Df, the exhaust gas temperature Dt, the outside air temperature Do, and the load characteristics Cs.

Note that the body temperature estimation unit 67 may estimate the necessary time Pr on the basis of the exhaust gas flow rate Df, the exhaust gas temperature Dt, the outside air temperature Do, the body characteristics Cb, and the load characteristics Cs.

Note that when the body characteristics Cb are highly likely to be constant, the body characteristic storage unit 61 may be omitted. That is, the body characteristics Cb may be added to the above-described correlation data in advance, or the body characteristics Cb may be added to the above-described simulation model in advance.

The load state estimation unit 68 estimates a volume Vc of the load and a contact area Ac of the load with the inner surface of the dump body 10 on the basis of the load weight Da.

The dump appropriateness determination unit 69 determines appropriateness of the dumping operation of the dump body 10 on the basis of the body temperature Te. The dump appropriateness determination unit 69 estimates the degree of dryness of the load on the basis of the body temperature Te. In a case where the load is wet, even when the dumping operation is performed, a state in which at least a part of the load adheres to the inner surface of the dump body 10 is maintained, and there is a case where the load is not discharged from the dump body 10. When the dump body 10 is heated by the exhaust gas flowing through the flow path 23, the load is dried, and adhesion of the load to the inner surface of the dump body 10 is suppressed. In a case where the body temperature Te is high, the dump appropriateness determination unit 69 determines that the drying of the load has been achieved, and determines that the load is discharged from the dump body 10 without adhering to the inner surface of the dump body 10 in a case where the dumping operation is performed. That is, in a case where the body temperature Te is high, the dump appropriateness determination unit 69 determines that the execution of the dumping operation is appropriate. In a case where the body temperature Te is low, the dump appropriateness determination unit 69 determines that the drying of the load has not been achieved yet, and determines that at least a part of the load adheres to the inner surface of the dump body 10 and is not discharged from the dump body 10 in a case where the dumping operation is performed. That is, in a case where the body temperature Te is low, the dump appropriateness determination unit 69 determines that the execution of the dumping operation is inappropriate.

In the embodiment, when the body temperature Te is lower than the prescribed temperature Tp, the dump appropriateness determination unit 69 determines that the drying of the load has not been achieved yet, and determines that the execution of the dumping operation is inappropriate. When the body temperature Te is equal to or higher than the prescribed temperature Tp, the dump appropriateness determination unit 69 determines that the drying of the load has been achieved, and determines that the execution of the dumping operation is appropriate. As described above, the prescribed temperature Tp is, for example, 120 [° C.].

Note that the dump appropriateness determination unit 69 may determine the appropriateness of the dumping operation on the basis of the elapsed time Pt from when the body temperature Te reaches the prescribed temperature Tp. At the time when the body temperature Te reaches the prescribed temperature Tp, there is a possibility that the drying of the load has not yet been achieved. Thus, when the elapsed time Pt from when the body temperature Te reaches the prescribed temperature Tp exceeds a predetermined prescribed time Pp, the dump appropriateness determination unit 69 may determine that the drying of the load has been achieved and determine that the execution of the dumping operation is appropriate.

Note that the dump appropriateness determination unit 69 may determine the appropriateness of the dumping operation on the basis of the body temperature Te and the load characteristics Cs. For example, when the moisture amount of the load is small, there is a high possibility that the drying of the load has been achieved at the time when the body temperature Te reaches the prescribed temperature Tp. In a case where the moisture amount of the load is large, there is a high possibility that the drying of the load has not been achieved yet at the time when the body temperature Te reaches the prescribed temperature Tp. Thus, the dump appropriateness determination unit 69 may change the prescribed time Pp on the basis of, for example, the load characteristics Cs. In a case where the moisture amount of the load is small, the dump appropriateness determination unit 69 shortens the prescribed time Pp. In a case where the moisture amount of the load is large, the dump appropriateness determination unit 69 lengthens the prescribed time Pp. When the elapsed time Pt from when the body temperature Te reaches the prescribed temperature Tp exceeds the prescribed time Pp after the change, the dump appropriateness determination unit 69 may determine that the drying of the load has been achieved and determine that the execution of the dumping operation is appropriate.

Note that the dump appropriateness determination unit 69 may determine the appropriateness of the dumping operation on the basis of the body temperature Te, the load characteristics Cs, the volume Vc of the load, and the contact area Ac of the load. For example, when the volume Vc of the load is small or the contact area Ac of the load is small, there is a high possibility that the drying of the load has been achieved at the time when the body temperature Te reaches the prescribed temperature Tp. When the volume Vc of the load is large or the contact area Ac of the load is large, there is a high possibility that the drying of the load has not yet been achieved at the time when the body temperature Te reaches the prescribed temperature Tp. Thus, the dump appropriateness determination unit 69 may change the prescribed time Pp on the basis of, for example, the load characteristics Cs, the volume Vc of the load, and the contact area Ac of the load. In a case where the moisture amount of the load is small, in a case where the volume Vc of the load is small, or in a case where the contact area Ac of the load is small, the dump appropriateness determination unit 69 shortens the prescribed time Pp. In a case where the moisture amount of the load is large, in a case where the volume Vc of the load is large, or in a case where the contact area Ac of the load is large, the dump appropriateness determination unit 69 lengthens the prescribed time Pp. When the elapsed time Pt from when the body temperature Te reaches the prescribed temperature Tp exceeds the prescribed time Pp after the change, the dump appropriateness determination unit 69 may determine that the drying of the load has been achieved and determine that the execution of the dumping operation is appropriate.

The display 71 includes a display screen on which display data is displayed. The display 71 is disposed inside the cab 9.

The display controller 72 includes a computer system disposed in the output device 35. The display controller 72 causes the display 71 to display the display data as output data.

The body temperature display unit 73 causes the display 71 to display the body temperature Te estimated by the body temperature estimation unit 67. The driver can recognize the degree of heating of the inner surface of the dump body 10 by checking the body temperature Te displayed on the display 71.

The dump appropriateness display unit 74 causes the display 71 to display the determination result of the dump appropriateness determination unit 69. The driver can perform the dumping operation of the dump body 10 at an appropriate timing by confirming whether or not the dumping operation displayed on the display 71 is appropriate.

[State Estimation Method]

FIG. 8 is a flowchart illustrating a state estimation method according to the embodiment. When the engine 6 is started, exhaust gas is discharged from the engine 6. The exhaust gas discharged from the engine 6 is supplied to the flow path 23. The flow rate of the exhaust gas flowing into the flow path 23 is detected by the exhaust gas flow rate sensor 16. The temperature of the exhaust gas flowing into the flow path 23 is detected by the exhaust gas temperature sensor 17. The exhaust gas flow rate acquisition unit 63 acquires the exhaust gas flow rate Df from the exhaust gas flow rate sensor 16. The exhaust gas temperature acquisition unit 64 acquires the exhaust gas temperature Dt from the exhaust gas temperature sensor 17 (step S1).

Further, the outside air temperature sensor 18 detects the temperature of the outside air around the dump body 10 at the time when the engine 6 is started. The outside air temperature acquisition unit 65 acquires the outside air temperature Do at the time when the engine 6 is started from the outside air temperature sensor 18. The outside air temperature Do at the time when the engine 6 is started is substantially equal to the temperature before the dump body 10 is heated by the exhaust gas. The outside air temperature Do can be regarded as an initial value related to the body temperature Te before the dump body 10 is heated by the exhaust gas.

The body temperature estimation unit 67 estimates the body temperature Te of the predetermined portion MP on the inner surface of the dump body 10 on the basis of the exhaust gas flow rate Df and the exhaust gas temperature Dt acquired in step S1. Further, the body temperature estimation unit 67 estimates the necessary time Pr until the body temperature Te reaches the prescribed temperature Tp on the basis of the exhaust gas flow rate Df and the exhaust gas temperature Dt acquired in step S1 (step S2).

Note that, as described above, the body temperature estimation unit 67 may estimate the necessary time Pr on the basis of the exhaust gas flow rate Df, the exhaust gas temperature Dt, and the outside air temperature Do. The body temperature estimation unit 67 may estimate the necessary time Pr on the basis of the exhaust gas flow rate Df, the exhaust gas temperature Dt, the outside air temperature Do, and the body characteristics Cb. When a load is loaded on the dump body 10, the body temperature estimation unit 67 may estimate the necessary time Pr on the basis of the exhaust gas flow rate Df, the exhaust gas temperature Dt, the outside air temperature Do, and the load characteristics Cs.

The body temperature display unit 73 causes the display 71 to display the body temperature Te estimated in step S2. Note that the body temperature display unit 73 may display the necessary time Pr estimated in step S2 on the display 71 (step S3).

By the loading work performed at the loading site 51, the load is loaded on the dump body 10. The dump truck 1 travels on the transportation path 53 from the loading site 51 toward the discharging site 52 in a state where the load is loaded on the dump body 10.

For example, in a state where the dump truck 1 travels on the transportation path 53, the dump appropriateness determination unit 69 determines appropriateness of the dumping operation of the dump body 10 on the basis of the body temperature Te estimated in Step S2 (step S4).

In the embodiment, when the body temperature Te is lower than the prescribed temperature Tp, the dump appropriateness determination unit 69 determines that the drying of the load has not been achieved yet, and determines that the execution of the dumping operation is inappropriate. When the body temperature Te is equal to or higher than the prescribed temperature Tp, the dump appropriateness determination unit 69 determines that the drying of the load has been achieved, and determines that the execution of the dumping operation is appropriate.

Note that, as described above, the dump appropriateness determination unit 69 may determine the appropriateness of the dumping operation on the basis of the elapsed time Pt after the body temperature Te reaches the prescribed temperature Tp. When the elapsed time Pt from when the body temperature Te reaches the prescribed temperature Tp exceeds the predetermined prescribed time Pp, the dump appropriateness determination unit 69 may determine that the drying of the load has been achieved and determine that the execution of the dumping operation is appropriate.

Note that, as described above, the dump appropriateness determination unit 69 may determine the appropriateness of the dumping operation on the basis of the body temperature Te and the load characteristics Cs. In a case where the load weight Da is acquired by the load weight acquisition unit 66 and the load state estimation unit 68 estimates the volume Vc of the load and the contact area Ac of the load, the dump appropriateness determination unit 69 may determine the appropriateness of the dumping operation on the basis of the body temperature Te, the load characteristics Cs, the volume Vc of the load, and the contact area Ac of the load.

In step S4, in a case where it is determined that the execution of the dumping operation is appropriate, that is, in a case where it is determined that the load is suppressed from adhering to the inner surface of the dump body 10 when the dump body 10 performs the dumping operation (step S4: Yes), the dump appropriateness display unit 74 causes the display 71 to display appropriateness of the execution of the dumping operation (step S5).

The driver of the dump truck 1 checks the display 71 and recognizes that the execution of the dumping operation is appropriate, and thus can execute the dumping operation of the dump body 10 after the dump truck 1 arrives at the discharging site 52.

In step S4, in a case where it is determined that the execution of the dumping operation is inappropriate, that is, in a case where it is determined that there is a high possibility that at least a part of the load adheres to the inner surface of the dump body 10 when the dump body 10 performs the dumping operation (step S4: No), the dump appropriateness display unit 74 causes the display 71 to display inappropriateness of the execution of the dumping operation (step S6).

The driver of the dump truck 1 checks the display 71 and recognizes that the execution of the dumping operation is inappropriate, and thus the driver can wait for the execution of the dumping operation until it is determined that the dumping operation is appropriate.

[Computer System]

Figure 9:
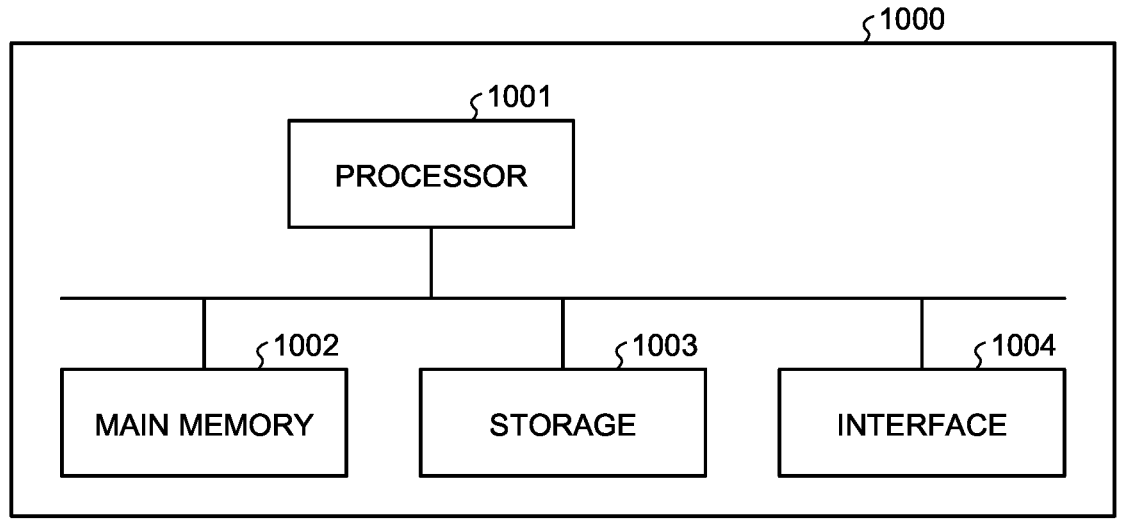
FIG. 9 is a block diagram illustrating a computer system according to the embodiment.

FIG. 9 is a block diagram illustrating a computer system 1000 according to the embodiment. Each of the controller 60 and the display controller 72 described above includes a computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The respective functions of the controller 60 and the display controller 72 described above are stored in the storage 1003 as a computer program. The processor 1001 reads the computer program from the storage 1003, develops the computer program in the main memory 1002, and executes the above-described processing according to the computer program. Note that the computer program may be distributed to the computer system 1000 via a network.

According to the above-described embodiment, the computer program or the computer system 1000 can execute detection of a flow rate of the exhaust gas flowing into the flow path 23 of the dump body 10, detection of a temperature of the exhaust gas flowing into the flow path 23, acquisition of the exhaust gas flow rate Df indicating detection data of the flow rate of the exhaust gas, acquisition of the exhaust gas temperature Dt indicating detection data of a temperature of the exhaust gas, and estimation of the body temperature Te indicating a temperature of the predetermined portion MP on an inner surface of the dump body 10 in contact with the load on the basis of the exhaust gas flow rate Df and the exhaust gas temperature Dt.

Further, the computer program or the computer system 1000 can execute determination of appropriateness of the dumping operation of the dump body 10 on the basis of the body temperature Te according to the above-described embodiment.

Effects

As described above, in the embodiment, the state estimation system 100 includes the exhaust gas flow rate acquisition unit 63 that acquires the exhaust gas flow rate Df indicating detection data of a flow rate of the exhaust gas flowing into the flow path 23 of the dump body 10, the exhaust gas temperature acquisition unit 64 that acquires the exhaust gas temperature Dt indicating detection data of a temperature of the exhaust gas flowing into the flow path 23, and the body temperature estimation unit 67 that estimates the body temperature Te indicating a temperature of the predetermined portion MP of an inner surface of the dump body 10 in contact with the load on the basis of the exhaust gas flow rate Df and the exhaust gas temperature Dt.

Thus, for example, the body temperature Te of the inner surface of the dump body 10 is acquired without installing a temperature sensor that detects the temperature of the inner surface of the dump body 10 in the dump body 10. Further, according to the embodiment, since the body temperature Te of the predetermined portion MP is estimated instead of estimating the temperature (temperature distribution) of the entire inner surface of the dump body 10, an increase in the calculation load of the controller 60 is suppressed.

A plurality of the predetermined portions MP is defined on the inner surface of the dump body 10. The body temperature estimation unit 67 estimates the body temperature Te of each of the plurality of the predetermined portions MP. Thus, a rough temperature distribution of the inner surface of the dump body 10 is estimated.

The body temperature estimation unit 67 estimates a necessary time Pr until the body temperature Te reaches the prescribed temperature Tp on the basis of the exhaust gas flow rate Df and the exhaust gas temperature Dt. Thus, the driver can recognize the necessary time Pr. Further, the driver can recognize an approximate time until the drying of the load is achieved.

The state estimation system 100 includes the outside air temperature acquisition unit 65 that acquires an outside air temperature Do indicating detection data of a temperature of the outside air around the dump body 10. Thus, the body temperature estimation unit 67 can estimate the necessary time Pr with high accuracy on the basis of the exhaust gas flow rate Df, the exhaust gas temperature Dt, and the outside air temperature Do.

The state estimation system 100 further includes the body characteristic storage unit 61 that stores the body characteristics Cb indicating characteristics of the dump body 10. Thus, the body temperature estimation unit 67 can estimate the necessary time Pr with high accuracy on the basis of the exhaust gas flow rate Df, the exhaust gas temperature Dt, the outside air temperature Do, and the body characteristics Cb.

The state estimation system 100 includes the body temperature display unit 73 that causes the display 71 disposed in the cab 9 of the dump truck 1 to display the body temperature Te. Thus, the driver can confirm the body temperature Te displayed on the display 71, and can recognize the degree of heating of the inner surface of the dump body 10.

The state estimation system 100 includes the dump appropriateness determination unit 69 that determines appropriateness of a dumping operation of the dump body 10 on the basis of the body temperature Te. Thus, the driver can perform the dumping operation at an appropriate timing on the basis of the determination result of the dump appropriateness determination unit 69.

The dump appropriateness determination unit 69 determines appropriateness of the dumping operation on the basis of the elapsed time Pt from when the body temperature Te reaches the prescribed temperature Tp. At the time when the body temperature Te reaches the prescribed temperature Tp, there is a possibility that the drying of the load has not yet been achieved. The dump appropriateness determination unit 69 can appropriately determine the appropriateness of the dumping operation of the dump body 10 on the basis of the elapsed time Pt.

The state estimation system 100 includes the load characteristic storage unit 62 that stores load characteristics Cs indicating a characteristic of the load. Thus, the dump appropriateness determination unit 69 can appropriately determine the appropriateness of the dumping operation on the basis of the body temperature Te and the load characteristics Cs.

The state estimation system 100 further includes the load weight acquisition unit 66 that acquires a load weight Da indicating detection data of the weight of the load loaded on the dump body 10, and the load state estimation unit 68 that estimates the volume Vc of the load and the contact area Ac of the load with the inner surface of the dump body 10 on the basis of the load weight Da. Thus, the dump appropriateness determination unit 69 can more appropriately determine the appropriateness of the dumping operation on the basis of the body temperature Te, the load characteristics Cs, the volume Vc of the load, and the contact area Ac of the load.

The state estimation system 100 includes the dump appropriateness display unit 74 that causes the display 71 disposed in the cab 9 of the dump truck 1 to display a determination result of the dump appropriateness determination unit 69. Thus, the driver can confirm whether or not the dumping operation displayed on the display 71 is appropriate, and can perform the dumping operation of the dump body 10 at an appropriate timing.

Other Embodiments

In the above-described embodiment, the output device 35 includes the display device. The output device 35 may include an audio output device. The audio output device outputs audio data as output data. For example, the body temperature Te and the determination result of appropriateness of the dumping operation may be output as audio data.

In the above-described embodiment, the controller 60 has the respective functions of the body characteristic storage unit 61, the load characteristic storage unit 62, the exhaust gas flow rate acquisition unit 63, the exhaust gas temperature acquisition unit 64, the outside air temperature acquisition unit 65, the load weight acquisition unit 66, the body temperature estimation unit 67, the load state estimation unit 68, and the dump appropriateness determination unit 69, and the display controller 72 has the respective functions of the body temperature display unit 73 and the dump appropriateness display unit 74. At least a part of the functions of the controller 60 may be provided in the display controller 72, or at least a part of the functions of the display controller 72 may be provided in the controller 60. Further, the controller 60 and the display controller 72 may be integrated. In addition, each of the body characteristic storage unit 61, the load characteristic storage unit 62, the exhaust gas flow rate acquisition unit 63, the exhaust gas temperature acquisition unit 64, the outside air temperature acquisition unit 65, the load weight acquisition unit 66, the body temperature estimation unit 67, the load state estimation unit 68, the dump appropriateness determination unit 69, the body temperature display unit 73, and the dump appropriateness display unit 74 may be configured by separate hardware (computer system).

In the above-described embodiment, an external computer arranged outside the dump truck 1 may have at least some functions of the controller 60. A cloud server is exemplified as the external computer. For example, the detection data of the exhaust gas flow rate sensor 16 and the detection data of the exhaust gas temperature sensor 17 may be transmitted to an external computer via a wireless communication network, and the external computer may calculate the body temperature Te or determine appropriateness of the dumping operation. The body temperature Te calculated by the external computer and the determination result on the appropriateness of the dumping operation may be transmitted to the dump truck 1 via the wireless communication network and output from the output device 35.

In the above-described embodiment, the dump truck 1 is a manned dump truck that operates by a driving operation of the driver. The dump truck 1 may be an unmanned dump truck that operates on the basis of a control command transmitted from a management computer of a control facility. In addition, the dump truck 1 may be a cabless dump truck having no cab 9. Furthermore, the output device 35 may be omitted. In that case, the output device 35 may be provided in the control facility. In addition, in a case where the dump truck is an unmanned dump truck, control may be performed such that the dumping operation cannot be performed by determination of the dump appropriateness determination unit 69.

In the above-described embodiment, the dump truck 1 is a rigid frame type. The dump truck 1 may be an articulated type.

In the above-described embodiment, the dump truck 1 is a rear dump type. The dump truck 1 may be a side dump type in which a load is discharged from the dump body 10 by inclining the dump body 10 leftward or rightward.

REFERENCE SIGNS LIST

1 DUMP TRUCK
2 VEHICLE BODY
3 TRAVELING APPARATUS
4 WHEEL
5 TIRE
6 ENGINE
6B EXHAUST GAS OUTLET
7 HOIST CYLINDER
8 BRACKET
8P ROTATION PIN
9 CAB
10 DUMP BODY
11 FRONT PLATE
12 BOTTOM PLATE
13 SIDE PLATE
13R RIGHT SIDE PLATE
13L LEFT SIDE PLATE
14 PROTECTOR PLATE
15 AFTERTREATMENT DEVICE
15A EXHAUST GAS INLET
15B EXHAUST GAS OUTLET

16 EXHAUST GAS FLOW RATE SENSOR
17 EXHAUST GAS TEMPERATURE SENSOR
18 OUTSIDE AIR TEMPERATURE SENSOR
19 LOAD WEIGHT SENSOR
21 INTRODUCTION PORT
22 EXHAUST PORT
23 FLOW PATH
23A FIRST FLOW PATH
23B SECOND FLOW PATH
23C THIRD FLOW PATH
23D FOURTH FLOW PATH
23E FIFTH FLOW PATH
23F SIXTH FLOW PATH
23G SEVENTH FLOW PATH
24 CONDUIT
25 CONDUIT
31 DRIVER SEAT
32 STEERING WHEEL
33 ACCELERATOR PEDAL
34 BRAKE PEDAL
35 OUTPUT DEVICE
36 CIGARETTE LIGHTER
37 POWER WINDOW SWITCH
38 SIDE LAMP SWITCH
39 OPTION SWITCH
40 OPERATION DEVICE
42 SHIFT LEVER
43 HOIST SWITCH
44 PARKING BRAKE SWITCH
45 HOIST SWITCH LOCK KNOB
50 WORK SITE
51 LOADING SITE
52 DISCHARGING SITE
53 TRANSPORTATION PATH
54 LOADING MACHINE
60 CONTROLLER
61 BODY CHARACTERISTIC STORAGE UNIT
62 LOAD CHARACTERISTIC STORAGE UNIT
63 EXHAUST GAS FLOW RATE ACQUISITION UNIT
64 EXHAUST GAS TEMPERATURE ACQUISITION UNIT
65 OUTSIDE AIR TEMPERATURE ACQUISITION UNIT
66 LOAD WEIGHT ACQUISITION UNIT
67 BODY TEMPERATURE ESTIMATION UNIT
68 LOAD STATE ESTIMATION UNIT
69 DUMP APPROPRIATENESS DETERMINATION UNIT
71 DISPLAY
72 DISPLAY CONTROLLER
73 BODY TEMPERATURE DISPLAY UNIT
74 DUMP APPROPRIATENESS DISPLAY UNIT
100 STATE ESTIMATION SYSTEM
1000 COMPUTER SYSTEM
1001 PROCESSOR
1002 MAIN MEMORY
1003 STORAGE
1004 INTERFACE
Ac CONTACT AREA
Cb BODY CHARACTERISTIC
Cs LOADING CHARACTERISTIC
Da LOAD WEIGHT
Df EXHAUST GAS FLOW RATE
Do OUTSIDE AIR TEMPERATURE
Dt EXHAUST GAS TEMPERATURE
MP PREDETERMINED PORTION
MP1 FIRST PREDETERMINED PORTION

MP2 SECOND PREDETERMINED PORTION
MP3 THIRD PREDETERMINED PORTION
MP4 FOURTH PREDETERMINED PORTION
MP5 FIFTH PREDETERMINED PORTION
MP6 SIXTH PREDETERMINED PORTION
MP7 SEVENTH PREDETERMINED PORTION
MP8 EIGHTH PREDETERMINED PORTION
MP9 NINTH PREDETERMINED PORTION
MP10 TENTH PREDETERMINED PORTION
Pp PRESCRIBED TIME
Pr NECESSARY TIME
Pt ELAPSED TIME
Te BODY TEMPERATURE
Tp PRESCRIBED TEMPERATURE
Vc VOLUME

The invention claimed is:

1. A state estimation system of a dump truck including an engine and a dump body that includes a flow path through which exhaust gas discharged from the engine flows, a load being loaded on the dump body, the state estimation system comprising:
an exhaust gas flow rate acquisition unit that acquires an exhaust gas flow rate indicating detection data of a flow rate of the exhaust gas flowing into the flow path;
an exhaust gas temperature acquisition unit that acquires an exhaust gas temperature indicating detection data of a temperature of the exhaust gas flowing into the flow path; and
a body temperature estimation unit that estimates a body temperature indicating a temperature of a predetermined portion of an inner surface of the dump body in contact with the load on a basis of the exhaust gas flow rate and the exhaust gas temperature.

2. The state estimation system according to claim 1, wherein
a plurality of the predetermined portions is defined on the inner surface, and
the body temperature estimation unit estimates a body temperature of each of the plurality of the predetermined portions.

3. The state estimation system according to claim 1, wherein
the body temperature estimation unit estimates a necessary time until the body temperature reaches a prescribed temperature on a basis of the exhaust gas flow rate and the exhaust gas temperature.

4. The state estimation system according to claim 3, further comprising:
an outside air temperature acquisition unit that acquires an outside air temperature indicating detection data of a temperature of outside air around the dump body, wherein
the body temperature estimation unit estimates the necessary time on a basis of the exhaust gas flow rate, the exhaust gas temperature, and the outside air temperature.

5. The state estimation system according to claim 4, further comprising:
a body characteristic storage unit that stores a body characteristic indicating a characteristic of the dump body, wherein
the body temperature estimation unit estimates the necessary time on a basis of the exhaust gas flow rate, the exhaust gas temperature, the outside air temperature, and the body characteristic.

6. The state estimation system according to claim 4, further comprising:

a load characteristic storage unit that stores a load characteristic indicating a characteristic of the load, wherein
the body temperature estimation unit estimates the necessary time on a basis of the exhaust gas flow rate, the exhaust gas temperature, the outside air temperature, and the load characteristic.

7. The state estimation system according to claim 1, further comprising:
a body temperature display unit that causes a display disposed in a cab of the dump truck to display the body temperature.

8. The state estimation system according to claim 1, further comprising:
a dump appropriateness determination unit that determines appropriateness of a dumping operation of the dump body on a basis of the body temperature.

9. The state estimation system according to claim 8, wherein
the dump appropriateness determination unit determines appropriateness of the dumping operation on a basis of an elapsed time from when the body temperature reaches a prescribed temperature.

10. The state estimation system according to claim 8, further comprising:
a load characteristic storage unit that stores a load characteristic indicating a characteristic of the load, wherein
the dump appropriateness determination unit determines appropriateness of the dumping operation on a basis of the body temperature and the load characteristic.

11. The state estimation system according to claim 10, further comprising:
a load weight acquisition unit that acquires a load weight indicating detection data of a weight of the load loaded on the dump body; and
a load state estimation unit that estimates a volume of the load and a contact area of the load with an inner surface of the dump body on a basis of the load weight, wherein
the dump appropriateness determination unit determines appropriateness of the dumping operation on a basis of the body temperature, the load characteristic, a volume of the load, and a contact area of the load.

12. The state estimation system according to claim 8, further comprising:
a dump appropriateness display unit that causes a display disposed in a cab of the dump truck to display a determination result of the dump appropriateness determination unit.

13. A dump truck, comprising:
an engine;
a dump body including a flow path through which exhaust gas from the engine flows; and
the state estimation system according to claim 1.

14. A state estimation method of a dump truck including an engine and a dump body that includes a flow path through which exhaust gas discharged from the engine flows, a load being loaded on the dump body, the state estimation method comprising:
detecting a flow rate of the exhaust gas flowing into the flow path;
detecting a temperature of the exhaust gas flowing into the flow path;
acquiring an exhaust gas flow rate indicating detection data of the flow rate of the exhaust gas;
acquiring an exhaust gas temperature indicating detection data of a temperature of the exhaust gas; and estimating a body temperature indicating a temperature of a predetermined portion on an inner surface of the dump body in contact with the load on a basis of the exhaust gas flow rate and the exhaust gas temperature.

15. The state estimation method according to claim 14, further comprising:

determining appropriateness of a dumping operation of the dump body on a basis of the body temperature.

16. The state estimation method according to claim 14, further comprising: estimating a necessary time until the body temperature reaches a prescribed temperature on a basis of the exhaust gas flow rate and the exhaust gas temperature.

* * * * *